Aug. 7, 1956 D. HOCHMAN 2,758,211

REACTANCE TUBE CONTROLLED OSCILLATOR

Filed Sept. 25, 1953

INVENTOR.
Daniel Hochman

BY Charles H. Brown

ATTORNEY

United States Patent Office 2,758,211

Patented Aug. 7, 1956

2,758,211

REACTANCE TUBE CONTROLLED OSCILLATOR

Daniel Hochman, Haddonfield, N. J., assignor to Radio Corporation of America, a corporation of Delaware Application September 25, 1953, Serial No. 382,297

7 Claims. (Cl. 250—36)

This invention relates to reactance tube controlled oscillators, and more particularly to such oscillators including means to automatically compensate for oscillator frequency drift caused by deterioration of the grid-plate transconductance of the oscillator tube with age.

Reactance tube controlled oscillators are in widespread use especially in frequency modulation radio communications systems. Conventional reactance tube controlled oscillators include an oscillator tube connected in circuit with a tuned circuit which determines the frequency of oscillation of the oscillator. The reactance tube or modulating tube includes a grid connected thru a phase quadrature network to the tuned circuit, and a plate electrode also connected to the tuned circuit. A modulating signal applied to a grid of the reactance tube varies the reactive current drawn by the reactance tube and thereby alters the frequency of oscillation of the oscillator.

An improved form of reactance tube oscillator is known as a reactance tube phase shift oscillator which is superior to the conventional circuit as regards range of frequency variation, linearity of frequency variation and freedom from amplitude modulation. These oscillators are described in a paper entitled "Reactance tube modulation of phase shift oscillators," appearing in the Bell System Technical Journal for October 1949, vol. XXVIII, No. 4, pages 601 to 607. A further improved reactance tube phase shift oscillator, having improved linear modulation characteristics, is described and claimed in a copending application of Howard R. Mathwich entitled "Frequency Modulated Oscillators," Serial No. 250,735, filed October 10, 1951, now Pat. No. 2,659,867 issued on November 17, 1953, and assigned to the assignee of this application.

The characteristics of vacuum tubes deteriorate with age. In reactance tube controlled oscillators, the deterioration in the grid-plate transconductance or mutual conductance, G*m*, causes the frequency output of the oscillator to drift towards higher and higher frequencies. In reactance tube controlled oscillators wherein the reactance tube is an inductive reactance tube, the deterioration in the grid-plate transconductance of the reactance tube causes an opposite effect on the output frequency of the oscillator. However, the oscillator tube normally draws at least five times as much current as the reactance tube draws, so that the reactance tube does not deteriorate as rapidly as the oscillator tube. For this and other reasons, the primary cause of oscillator frequency drift is due to the aging of the oscillator tube.

It is an object of this invention to provide a reactance tube controlled oscillator which minimizes frequency drift due to deterioration of the grid-plate transconductance of the oscillator tube.

It is another object to provide an improved reactance tube phase shift oscillator.

In one aspect the invention comprises a reactance tube phase shift oscillator including an oscillator tube and an inductive reactance tube coupled together in a circuit including two 90 degree lagging or inductive phase shift networks. A resistor is inserted in the cathode circuit of the oscillator tube. The voltage developed across this cathode resistor decreases as the tube ages. Some or all of the potential developed across the oscillator cathode resistor is applied to the grid of the inductive reactance tube. The aging of the oscillator tube causes the oscillator frequency to rise, but the decreasing potential applied to the grid of the reactance tube causes a compensating decrease in the frequency of oscillation so that the frequency remains constant. The invention is also applicable to conventional reactance tube controlled oscillators.

These and other objects and aspects of the invention will be apparent to those skilled in the art from the following more detailed description taken in conjunction with the appended drawings wherein.

Figure 1:
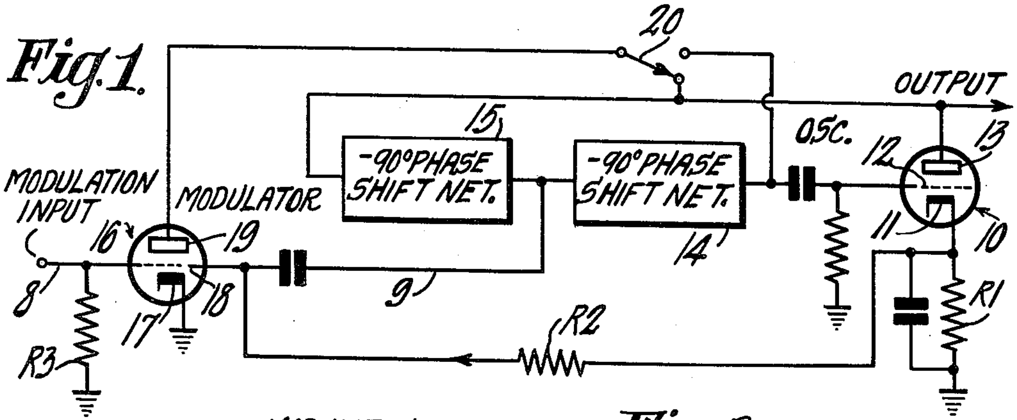
Fig. 1 is a simplified diagram of a reactance tube phase shift oscillator constructed according to the teachings of this invention.

Fig. 1 shows a reactance tube phase shift oscillator in simplified form. An oscillator tube 10 includes a cathode 11, a grid 12 and a plate 13. The cathode 11 is connected thru a by-passed cathode resistor R1 to ground. The grid 12 is coupled thru a first quadrature lagging (—90 degree) network 14 and a second quadrature lagging (—90 degree) network 15 to the plate 13. A reactance tube 16 includes a cathode 17, a grid 18 and a plate 19. The grid 18 of the reactance tube is coupled to the junction point between the quadrature phase shift networks 14 and 15. The plate 19 of the reactance tube is connected to the terminal end of one or the other of the phase shift networks 14 and 15 as determined by the position of the alternative connection switch 20. The cathode 11 of oscillator tube 10 is coupled through a resistor R2 to the grid 18 of the reactance tube 16. A modulating signal is applied from lead 8 to the grid 18 of the reactance tube 16 to effect a corresponding modulation of an output frequency from the plate 13 of oscillator tube 10.

In the operation of the circuit of Fig. 1, the 90 degree phase shifts in networks 14 and 15 add up to provide a 180 degree phase shift in the circuit from the plate 13 to the grid 12 of oscillator tube 10. This 180 degree phase shift is necessary to maintain oscillations in the oscillator circuit. The 90 degree phase shift network 15 is coupled to the grid 18 of reactance tube 16 by lead 9 so that the grid 18 is in quadrature phase relation with the oscillations on the grid or on the plate of the oscillator tube 10, depending on the connection thru switch 20. A modulating signal is applied to the grid 18 of reactance tube 16 to vary the inductive reactive current drawn by the reactance tube and to thereby correspondingly modulate the oscillator output frequency from the plate 13 of oscillator tube 10.

As oscillator tube 10 ages, its G*m* decreases so that the current through cathode resistor R1 decreases, and the output frequency of the oscillator tends to increase. A frequency increase is prevented by applying a part of the potential across cathode resistor R1 through a voltage divider consisting of resistors R2 and R3 to the grid 18 of inductive reactance tube 16. When the potential across resistor R1 decreases, the decreased potential applied to the grid 18 tends to cause the output frequency to decrease. By the proper choice of the values of resistors R1, R2 and R3, the output frequency is maintained constant despite the effects of aging of oscillator tube 10. The reactance tube 16 should be an inductive reactance tube to provide frequency correction in the correct direction.

Figure 2:
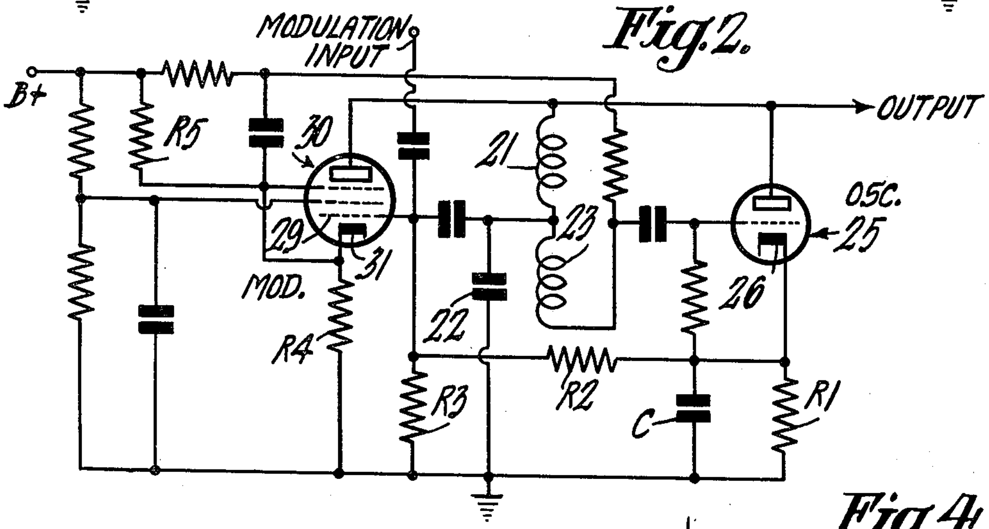
Fig. 2 is a detailed circuit diagram of a reactance tube phase shift oscillator including means for preventing output frequency drift as a result of aging of the oscillator tube.

Fig. 2 is a detailed circuit diagram of a practical reactance tube phase shift oscillator constructed according to this invention. Inductor 21, part of capacitor 22, and stray capacitance constitutes a −90 degree phase shift network coupled between the plate and grid of reactance tube 30. Inductor 23, part of capacitor 22 and stray capacitance constitutes another −90 degree phase shift network in the −180 degree phase shift circuit coupling the grid and plate of the oscillator tube 25. Resistors R1, R2, R3, R4 and R5, and capacitor C are provided to effect a cancellation of the oscillator frequency drift which would otherwise result with aging of oscillator tube 25.

The cathode 26 of oscillator tube 25 is connected through resistor R1 to ground and also through by-pass capacitor C to ground. A potential is developed across resistor R1 depending on the amount of current flowing therethru from oscillator tube 25. Capacitor C is selected to have a value appropriate to the frequency of oscillation of oscillator tube 25 so that it smoothes out the potential variations across resistor R1. The direct current potential on the cathode 26 of tube 25 is therefore a steady direct current potential which gradually decreases as the oscillator tube 25 ages. As the tube 25 ages, its grid-plate transconductance, G*m*, decreases. The G*m* is equal to the ratio of an incremental change in plate current to an incremental change in grid voltage. Changes in the G*m* of the oscillator tube 25 result in changes in the output frequency in accordance with the function graphically illustrated in Fig. 3 by the curve labeled "Oscillator tube." It will be noted from Fig. 3 that a 20% decrease in the G*m* of the oscillator tube may result in an oscillator frequency increase of 6%, for example.

A portion of the direct current potential developed on the cathode 26 of oscillator tube 25 is applied thru a voltage divider consisting of resistors R2 and R3 to the control grid 29 of the inductive reactance tube 30. Changes in the G*m* of the reactance tube 30 cause changes in the output frequency of the oscillator according to the function graphically illustrated in Fig. 3 by the curve labeled "Reactance tube." It will be noted that the curve for the reactance tube slopes in the opposite direction compared with that of the curve for the oscillator tube. This is the case when the reactance tube 30 is connected to insert a variable amount of inductive reactance into the oscillator circuit. The reactance tube 30 must be an inductive reactance tube, as contrasted with a capacitive reactance tube, to effect the compensation for decreases in the G*m* of the oscillator tube 25.

Figure 3:
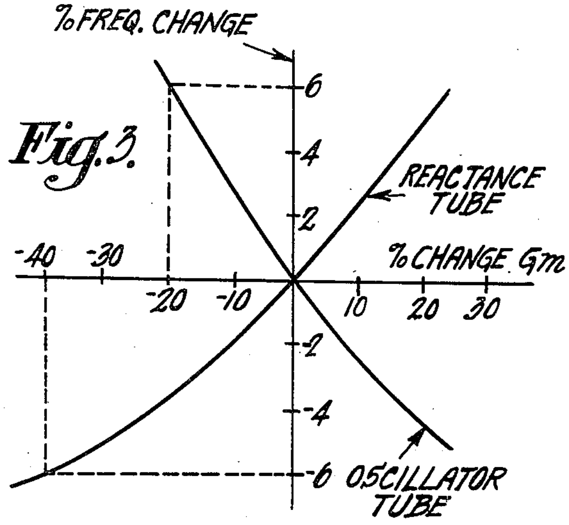
Fig. 3 is a chart showing how the oscillator output frequency varies with changes in the grid-plate transconductance, G*m*, of the reactance tube and of the oscillator tube in a typical inductive reactance tube controlled oscillator.

It will be noted from Fig. 3 that a 40% decrease in the G*m* of the reactance tube may be necessary to cause a 6% decrease in the output frequency of the oscillator. In this example, a 40% decrease in the G*m* of the reactance tube exactly compensates for the frequency change caused by a 20% decrease in the G*m* of the oscillator tube due to aging. As is well known in the art, the G*m* of the vacuum tube varies with the voltage applied to the control grid (or screen grid) of the tube. Therefore, the G*m* of the reactance tube is reduced to 40% less than its original value by reducing the bias voltage applied to its control grid 29. The voltage decrease necessary to reduce the G*m* of the reactance tube by 40% is determined from the voltage characteristic charts of the particular tube employed and the values of certain of the circuit components. The values of resistors R1, R2 and R3 are selected to provide that degree of reduction in the potential on the grid 29 of reactance tube 30 which compensates to the degree desired for the change in output frequency due to the decrease G*m* of the oscillator tube 25.

In order for the G*m* of the reactance tube 30 to vary solely as a function of the potential applied to its control grid 29, it is important that the cathode 31 be maintained at a constant potential. This is accomplished by means of a voltage divider including resistors R4 and R5 connected from ground to the B+ potential. The values of resistors R4 and R5 are so chosen that the plate current through the reactance tube 30 is only a small percentage of the total current flowing through cathode resistor R4. Thus, the cathode potential of the reactance tube 30 is substantially independent of the current flowing through the tube and is primarily fixed as a certain percentage of the B+ potential. The capacitor C is chosen to have a value which will readily pass the frequency of oscillations present in the oscillator circuit.

In selecting the values for resistors R1, R2 and R3, the value of resistor R1 is selected with reference to the plate current characteristics of the oscillator tube 25 to provide a compensating potential for the grid 29 of reactance tube 30 which will result in the required compensating deduction in the G*m* of the reactance tube 30. The calculated value for resistor R1 will normally not be a standard resistor value and the next higher standard resistor value is selected. The value of resistor R2 is determined so that together with resistor R3 it will provide the desired voltage divider action to reduce the effect of resistor R1 being larger than the desired calculated value. If the calculated value for resistor R1 is close to the value of a standard size resistor, then resistor R3 may be omitted and resistor R2 will then have a value of approximately from 100,000 ohms to one megohm, depending on the grid current of the reactance tube 30. In addition, the values of resistors R1, R2 and R3 should be such that the resistance of resistor R3 in parallel with resistors R1 and R2 in series is equal to the value of grid resistance normally employed in a circuit not providing compensation for aging of the oscillator tube.

Figure 4:
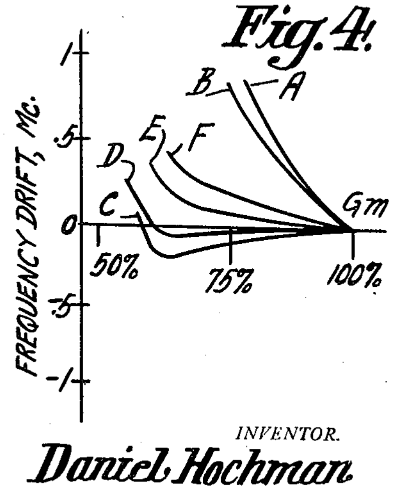
Fig. 4 is a chart showing the oscillator frequency drift as a result of aging of the oscillator tube in the circuit of Fig. 2 when various values of resistors are used in the circuit.

Curve A of Fig. 4 shows the frequency drift of an oscillator circuit without compensation as the G*m* of the oscillator tube 25 deteriorated to about 75% of its original value. It will be seen that the frequency increased about 1 megacycle. Curves B through F show oscillator frequency drift versus percentage deterioration in the G*m* of the oscillator tube 25 when compensation was employed according to the teachings of this invention. The values of the resistors R1 thru R5 which resulted in the frequency correction characteristic curves labeled B through F in Fig. 4 were as shown by the following table:

| Characteristic | $R_1$ ohm | $R_2$ ohms | $R_3$ ohms | $R_4$ ohms | $R_5$ ohms |
|---|---|---|---|---|---|
| A | Without Compensation | | | | |
| B | 820 | 120K | 470K | 3,300 | ∞ |
| C | 470 | 100K | 390K | 1,000 | 47K |
| D | 330 | 100K | 390K | 1,000 | 68K |
| E | 270 | 100K | 390K | 1,000 | 82K |
| F | 100 | 100K | ∞ | 1,000 | 150K |

In all cases the oscillator was one operating at a frequency of 40 megacycles and the by-pass capacitor C had a value of 680 micromicrofarads. It is apparent from the chart of Fig. 4 that the resistor values which resulted in the characteristic curve labeled D provided almost 100% frequency compensation through a reduction in the G*m* of the oscillator tube 25 to a value of about 60% of its normal value. It is apparent from a comparison of the characteristic curve D with that of characteristic curve A of prior art circuits, that the present invention provides a very high degree of output frequency stability in spite of extreme deterioration in the *Gm* of the oscillator tube.

What is claimed is:

1. A reactance tube phase shift oscillator comprising, an oscillator tube including cathode, grid and plate electrodes, a reactance tube including cathode, grid and plate electrodes, two 90-degree inductive phase shift networks coupled in series from the plate of said oscillator tube to the grid of said oscillator tube, means coupling one of said phase shift networks from the plate of said reactance tube to the grid of said reactance tube, a cathode resistor connected from the cathode of said oscillator tube to a point of reference potential, means to apply at least a portion of the potential developed across said cathode resistor to the grid of said reactance tube, and means to maintain the cathode of said reactance tube at a substantially fixed potential.

2. A reactance tube phase shift oscillator defined in claim 1, wherein said last named means comprises, a source of uni-directional potential having a negative terminal connected to said point of reference potential and having a positive terminal, and a voltage divider having one terminal connected to said positive terminal of the source, having the other terminal connected to said negative terminal of the source, and having an intermediate terminal connected to said cathode of said reactance tube.

3. A reactance tube phase shift oscillator as defined in claim 1 wherein said means coupling at least a portion of the potential developed across said cathode resistor to the grid of said reactance tube comprises a resistor voltage divider.

4. A reactance tube controlled oscillator comprising, an oscillator tube including cathode, grid and plate electrodes, circuit means coupled to said oscillator tube to provide an oscillator circuit, a reactance tube including cathode, grid and plate electrodes, circuit means coupling said reactance tube to said oscillator circuit to vary the output frequency of said oscillator circuit in accordance with the inductive current drawn by said reactance tube, means to maintain the potential on the cathode of said reactance tube at a substantially constant value despite changes in current drawn by said tube, a first resistor connected in series with the plate-cathode path of said oscillator tube, a resistor connected from the grid of said reactance tube to a point of reference potential, and a resistor connected from the cathode of said oscillator tube to the control grid of said reactance tube.

5. A reactance tube controlled oscillator as defined in claim 4, and in addition, means to maintain the cathode of said reactance tube at a substantially constant potential.

6. A reactance tube controlled oscillator as defined in claim 5, and in addition, a by-pass capacitor shunting said first resistor.

7. A reactance tube controlled oscillator as defined in claim 6 wherein said resistors have values with relation to the characteristics of said tubes so that the portion of the potential developed across said first resistor and applied to the control grid of said reactance tube is such as to substantially completely compensate for output frequency drift due to deterioration in the *Gm* of said oscillator tube.

References Cited in the file of this patent

UNITED STATES PATENTS

| | | |
|---|---|---|
| 2,408,192 | Bell et al. | Sept. 24, 1946 |
| 2,486,265 | Dennis | Oct. 25, 1949 |